(12) United States Patent
Schlachter

(10) Patent No.: US 8,325,050 B1
(45) Date of Patent: Dec. 4, 2012

(54) MULTIPURPOSE CENTRALIZED WATER CONSERVATION, METERING, SPRINKLER ALARM AND ABSOLUTE LEAK DETECTOR

(76) Inventor: Raymond W. Schlachter, Brooklyn, NY (US)

(*) Notice: Subject to any disclaimer, the term of this patent is extended or adjusted under 35 U.S.C. 154(b) by 0 days.

(21) Appl. No.: 13/506,773

(22) Filed: May 16, 2012

Related U.S. Application Data

(60) Provisional application No. 61/520,832, filed on Jun. 16, 2011.

(51) Int. Cl.
*G08B 21/00* (2006.01)
*G08B 23/00* (2006.01)
*G01F 1/22* (2006.01)
*G01F 15/14* (2006.01)

(52) U.S. Cl. ............... 340/606; 340/870.02; 73/861.53; 73/273

(58) Field of Classification Search .................. 340/606, 340/870.01, 870.03; 73/861.53, 273; 235/379, 235/440, 439
See application file for complete search history.

(56) References Cited

U.S. PATENT DOCUMENTS 7,377,184 B1 * 5/2008 Schlachter ................ 73/861.53

* cited by examiner

*Primary Examiner* — Brian Zimmerman
*Assistant Examiner* — Omeed Alizada

(57) ABSTRACT

A non-intrusive flow detector consists of an easily adjustable visible light optical sensor assembly, producing a spot of light, which attaches non-obstructively and non-invasively to a fluid flow meter. The spot of visible focused light requires less than one milli-amp. The sensor monitors dial movement of a least flow dial or wheel and generates an electrical signal representative of a flow through the meter. The signal is then transformed by a 10-bit A/D converter and further processed. The flow rate and consumption is displayed in suitable units on a LCD. The microprocessor can be programmed to detect extremely small flow rates. With an appropriate sample time programmed, a flow of a few drops per minute would be detected. This embodiment aims to provide an improved method and means for enabling a consumer to monitor consumption of a metered source. This embodiment can be utilized as a sprinkler alarm.

18 Claims, 14 Drawing Sheets

Source Code, Patent Drawings

```
'*****************************************************************
'*  Name    : MICRO.BAS                                           *
'*  Author  : Raymond W. Schlachter                               *
'*  Notice  : Copyright (c) 2007 Raymond W. Schlachter            *
'*          : All Rights Reserved                                 *
'*  Date    : 9/6/2007                                            *
'*  Version : 1.0                                                 *
'*  Notes   :                                                     *
'*          :                                                     *
'*****************************************************************
    define Loader_Used 1
    clear
    define LCD_DREG   PORTB
    define LCD_DBIT   0
    define LCD_RSREG  PORTB
    define LCD_RSBIT  4
    define LCD_EREG   PORTB
    define LCD_EBIT   5
    pause 500
    TRISA=%11111111      'port A all inputs
    ADCON1=%10000010     'port A analog & right justify
    TRISC=%11101111      'port C all inputs except PORTC.4
    INTCON=%10100000
    define ADC_BITS   10
    define ADC_CLOCK  3
    define ADC SAMPLEUS  50
    Peakvalue       var word
    Sensorvalue     var word
    Lastsensorvalue var word
    Threshold       var word
    Sum      var word      '# of cycles in Time0. (sample time)
    Ticks0   var word      '# of counts/sec gen. by counter TMR0 on overflow
    Ticks1   var word      '# of counts in delay time Time1
    Time0    var word      'sampling time, see below
    Time1    var word      'alarm delay, see below
    Vala var byte
    Valb var byte
    R    var byte
    Range   var byte
    Trigger var byte
    Alresetnum    var word
    Alrescount    var word
    Alresetnum=1000    'count used to reset Ticks1 to 0
    Threshold=600      'when sensorvalue drops below this value take action
    Peakvalue=0
    Vala=10            'determines MED value to infinity
    Valb=20            'determines HIGH value to infinity
    Time0=1220         'Time0 is sampling time. Sample T in sec=(Time0)/61
    Time1=2            'Time1 is alarm delay=(Time0)X(Time1)
    on interrupt goto Interruptroutine
    gosub Setup
    Main0:
    ADCIN 0,Sensorvalue
    if range=1 then R=1
    if range=2 then R=Vala
    if range=3 then R=Valb
    lcdout $fe,1,dec Sensorvalue," R=",dec R
    if ticks1>=time1 then
    lcdout $fe,$C0,"ALARM"," ",dec Sum
    pause 10
    goto bypass1
```

Figure 10 A

Source Code, Patent Drawings

```
endif
if ticks1=0 then
lcdout $fe,$C0,"CLEAR"," ",dec sum
pause 10
goto bypass1
endif
lcdout $fe,$C0,"READY"," ",dec sum
pause 10
bypass1:
if sensorvalue>=threshold then
if sensorvalue>=lastsensorvalue then
peakvalue=sensorvalue
endif
else
if peakvalue>=threshold then
trigger=1
sum=sum+1
alrescount=0
endif
peakvalue=0
endif
lastsensorvalue=sensorvalue
if trigger=1 then
OPTION_REG=%10000101      'TMR0 activated. With prescaler set to 64,
else                      'and 8 bit counter,256x64=16384 counts.
OPTION_REG=%10100000      'clock=4mh,FOSC/4=1mh,
TMR0=0                    '1,000,000/16384=61.035 counts/min
trigger=0
alrescount=alrescount+1
endif
if alrescount=alresetnum then
alrescount=0
ticks1=0
PORTC.4=0
endif
goto Main0
disable
interruptroutine:
ticks0=ticks0+1
if ticks0<time0 then resetinterrupt
ticks0=0
if sum>0 and range=1 then  'Range=1 to infinity
gosub delay
endif
if sum >=vala and range=2 then   'Range=Vala to infinity
gosub delay
endif
if sum<vala and range=2 then gosub resetbelowvalue
if sum>=valb and range=3 then    'Range=Valb to infinity
gosub delay
endif
if sum<valb and range=3 then gosub resetbelowvalue
lcdout $fe,1,"G/m=",dec Sum*10/410,".",dec3 (Sum*1000)/41
pause 2000
sum=0
ticks0=0
trigger=0
OPTION_REG=%10100000
goto main0
resetinterrupt:
INTCON.2=0
resume
```

Figure 10 B

Source Code, Patent Drawings

```
enable
delay:
ticks1=ticks1+1   'Ticks1 can be used to determine the flow time.
if ticks1>=time1 then gosub alarm  'Flow=(Time0)/61x(Ticks1)
return
alarm:
alrescount=0
PORTC.4=1
return
resetbelowvalue:
PORTC.4=0
lcdout $fe,1,"FLOW"
lcdout $fe,$C0,"BELOW R"
pause 1000
ticks1=0
return
setup:
lcdout $fe,1,"PIC1,2,3"
lcdout $fe,$C0,"THEN"
pause 1000
setup1:
lcdout $fe,$C0,"PRESS B4"
pause 1000
if PORTC.0=0 then
lcdout $fe,1,"ANY FLOW"
range=1
pause 500
endif
if PORTC.1=0 then
lcdout $fe,1,"MED 2"
range=2
pause 500
endif
if PORTC.2=0 then
lcdout $fe,1,"HIGH 3"
range=3
pause 500
endif
if range=0 then goto setup
if PORTC.3=0 then return
goto setup1
end
```

Figure 10 C

MULTIPURPOSE CENTRALIZED WATER CONSERVATION, METERING, SPRINKLER ALARM AND ABSOLUTE LEAK DETECTOR

This application claims the benefit of provisional patent application Ser. No. 61/520,832 filed Jun. 16, 2011 by the present inventor.

FIELD OF THE INVENTION

The invention relates to fluid flow detectors for detecting unusual flow volumes and more particularly, to a noninvasive detector that attaches to existing meters to alert property owners of abnormal flow. In conjunction, the above invention also serves as a water conservation device and an extremely sensitive leak detector. The invention can be utilized as a sprinkler alarm. Automatic shutoff valves, external to the invention, can be incorporated to cutoff the water flow at predetermined values if desired.

BRIEF DESCRIPTION OF THE DRAWINGS

A complete understanding of the present invention may be obtained by reference to the accompanying drawings when taken in conjunction with the detailed description thereof in which:

FIGS. 10A, 10B and 10C contain a listing of the source code for the microprocessor.

Figure 1:
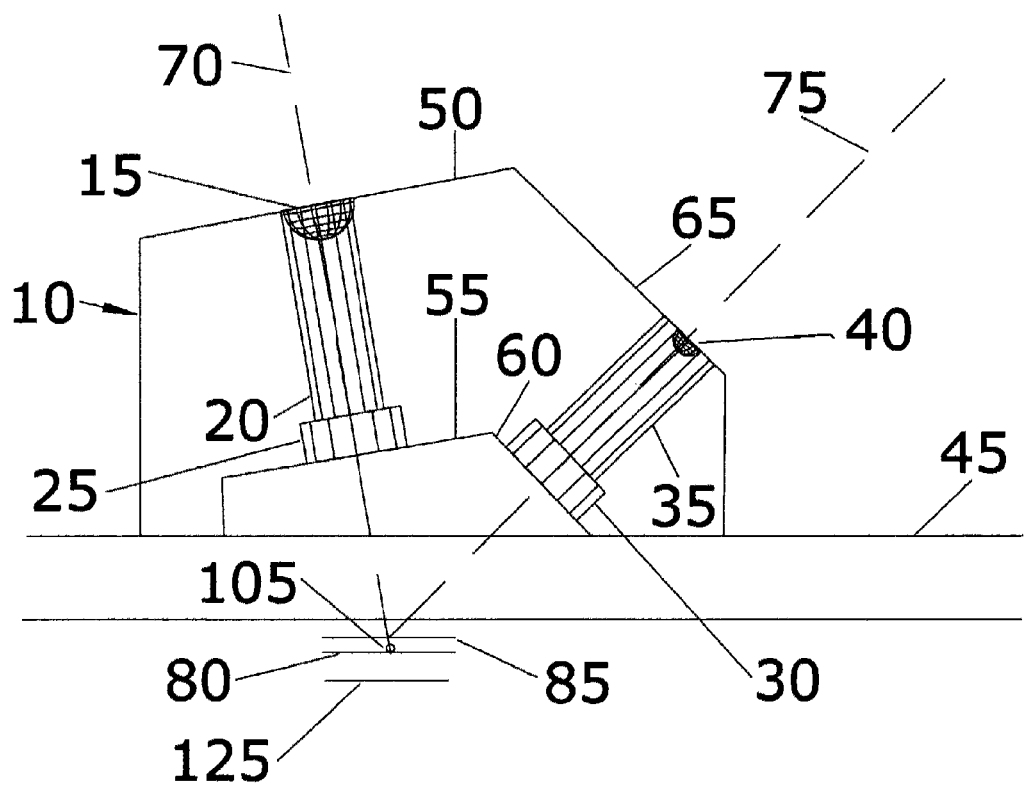
FIG. 1 is a view of the sensor assembly showing the location and positioning of the components and their relationship to the meter face and its' pertinent mechanisms.

For purposes of brevity and clarity, like components and elements of the apparatus of this invention will bear the same designations or numbering throughout the FIGURES.

BACKGROUND OF THE INVENTION

Leaks or other unusual events that cause extraordinary flow volumes in piping systems unnecessarily cost residential and commercial property owners money. In addition, leaking water can cause large amounts of damage to a home or commercial space. Water is typically expensive; high utility bills may result from excess or wasted usage. In addition, the growing scarcity of potable water motivates reducing and eliminating waste.

Water damage resulting from leaks can cost property owners or insurance companies additional expense. A detector that monitors fluid flow volume and alerts owners, authorities, insurance companies, or a central station alarm company when unusual volume is detected may reduce overall utility usage, as well as unnecessary damage and expenses caused by water leaks. Additionally, a small, easily installable, easily operable detector will encourage and facilitate use by property owners.

The NYCDEP is offering its customers a leak notification program that will automatically send the property owner an alert if they notice a dramatic increase in daily water use. The alert is sent via email the next day.

Many current flow meters that measure flow by automatically reading meters are bulky are designed for technician use only, and do not alert owners to unusual flow volumes. Rather, they merely report actual consumption. Utility meters are often located inaccessibly. For this reason, and to reduce field personal, utility companies, for instance, find advantage in automatically reading meters electronically, and transmitting the reading, such as by radio waves.

U.S. Pat. No. 7,742,883 issued Jun. 22, 2010 to Dayton, et al, is a faucet flow timing system that monitors volume of water usage. The present invention relates to an energy consumption awareness and flow meter. The invention provides a device to improve awareness, such as within a household or a business, of water consumed through, for instance, bathing and showering, and encourages conservation by providing information related to water usage. Most of this can be accomplished with a timer, calculator and a gallon jug.

U.S. Pat. No. 7,549,322 issued Feb. 28, 2007 to Kaplan, discloses a system and method for detecting a leak in a piping system. An IR (not visible) LED is used as a light source to illuminate the face of the meter. It mentions a spot of light but does not teach how to accomplish this. This system does not actually measure the quantity of water flowing. An RC timing circuit through an A.C. coupled transistor amplifier times the flow. The detailed description and schematic drawings are nebulous.

U.S. Pat. No. 7,377,184 issued May 27, 2008 to Schlachter discloses a non-intrusive flow detector consisting of an optical sensor assembly. It uses an infrared light source (not visible) that requires a fine-tuning adjustment to accurately position the optical sensor over the least flow indicator. The pick-up is a phototransistor whose signal is A.C. coupled to an amplifier and feed to adjustable timing circuits, which in turn, determine how long the flow continues. It does not report actual consumption.

U.S. Pat. No. 7,360,413 issued Apr. 22, 2008 to Jeffries et al. discloses a wireless water flow monitoring and leak detection system and method. The wireless flow sensors require installation directly into the piping system. A piston with a magnet is arranged to reciprocate in a cylinder-displaced proportional to the flow. A Hall Effect Sensor is utilized to sense the position of the piston. This arrangement is subject to fouling. They claim the sensor can detect a water flow of ¼ cup per minute, which is 2 ounces per minute.

U.S. Pat. No. 7,042,368 issued May 9, 2006 to Patterson et al., discloses an automated meter reader to report utility consumption. A device and method of use are described having an optical transceiver that emits light toward the a meter face, an optical receiver that accepts light reflected off the meter face, and an A.C coupled amplifier and gain control as part of a signaling processing unit. Patterson et al. do not disclose any means to continuously monitor for unusual flow rates. The detector is not designed for property owner use.

U.S. Pat. No. 5,771,920 issued Jun. 30, 1998 to Jewett et al., discloses a domestic water valve assembly that closes a motor actuated valve when leaks are detected. The flow-sensing device is a vane that rotates about an axis in proportion to the rate of flow, which controls the value of a variable resistor. This arrangement is prone to fouling and rendered inaccurate in time by contaminants in the water requiring replacement. It requires alterations to the plumbing U.S. Pat. No. 6,216,727 issued Apr. 17, 2001 to Genova et al., discloses a water flow-sensing device that utilizes a linear variable differential transformer LVDT. The movement and position of a magnet inside a pipe determines to output. In addition to restricting the overall fluid flow through the piping system it is subject to clogging and requires alteration to the plumbing.

U.S. Pat. No. 5,214,587 issued May 25, 1993 to Green, also discloses a device for monitoring utility usage. A meter sensor assembly is attached to a meter and a user interface unit with LCD display processes the sensor signal into useful data. This device is less bulky and obtrusive than that of Patterson et al., but it is built to read only meters with rotating discs. Again it reports consumption, but does not automatically alert a user or other party to unusual volumes.

U.S. Pat. No. 6,317,051 issued Nov. 13, 2001 to Cohen, discloses an invasive flow-monitoring device mounted in series with a water pipe, a controller, logic components and a shut-off valve to shut off water flow when a predetermined condition is met. No meter is read, and actual modifications to existing piping systems must be made.

U.S. Pat. No. 5,228,329 issued Jul. 20, 1993 to Dennison, discloses a leak detector that uses a series of thermal fluid flow sensors that must be installed into the piping system. These sensors detect leaks indirectly by comparing variations in pipe temperature caused by variations in flow rate. When leaks are detected, a chime and a light emitting diode are activated.

Presently available flow detectors that do alert owners to unusual flow volumes are invasive to the meters and piping systems, bulky and unwieldy for typical owners to install and operate. Whereas automatic meter readers are somewhat non-invasive, leak detectors typically use invasive means such as valve or pipe add-ons. Other detectors use non-centralized systems that do not detect flow starting at the meter where the piping system begins. These detectors change conductivity when water bridges two or more electrodes and are strategically located through out the premises.

Operation of Sprinkler Systems.

At present, existing sprinkler systems utilize a flow detector that is comprised of a mechanical paddle or vane mounted inside of the water pipe. This paddle is configured as a lever with a pivot point and operates a micro switch when it is deflected by the water flow in order to generate a fire alarm. Some are equipped with a pneumatic retard timer to compensate for pressure variations; this can be set for 10 to 90 seconds. To install this paddle, a hole has to be made in the iron water pipe and with other necessary gaskets, switch, wiring etc., the installation is completed. This installation is time consuming and requires a skilled technician to install thus making it a costly venture. In addition, attempting to make a hole in the pipe occasionally causes the pipe to shatter incurring additional expense. Since it is a mechanical system with metal parts (the paddle itself is made of plastic) and usually installed in a hostile, wet, dirty environment, it is subject to fouling and corrosion. Periodic testing is required by the fire department agencies to insure the proper functioning of this sprinkler alarm.

A properly installed, protected, LED, photo sensor arrangement on the water meter itself would eliminate most of the objections cited. In addition, any small leaks would be detected in a wet system. Suitable delay times to compensate for water pressure surges etc. could be easily programmed into a microprocessor. With the mechanical system, the water flow leak has to move the paddle (lever) a sufficient distance to activate the micro switch. The Potter Electric devices require a flow of 10 gallons per minute and must exceed the retard time. Even with the LED, photo sensor arrangement, periodic testing would still be required to insure proper functioning.

It would be advantageous to provide a centralized flow detector to detect flow rates from the beginning throughout the entire piping system.

It would also be advantageous to provide a fluid flow detector that continuously monitors the dials on a meter for unusual flow volume.

It would further be advantageous to provide an easily installable, easily operable fluid flow detector to facilitate use by a property owner.

It would also be advantageous to provide a fluid flow detector with a sensor assembly mechanically adjustable in three planes.

It would further be advantageous to provide a fluid flow detector capable of alerting property owners, authorities, insurance companies, or central stations of unusual fluid flow rates.

It would be advantageous to provide a non-evasive fluid flow detector that does not require modification to the existing piping systems or the existing meters.

It would be advantageous to have a visible, focused spot of light consuming less than 1 milli-amp at 5 volts, incorporated into the fluid flow detector to facilitate adjustment and battery operation.

A DETAILED DESCRIPTION OF THE EMBODIMENTS

A portion of the disclosure of this patent document contains material, which is subject to copyright protection. The copyright owner has no objection to the facsimile reproduction by anyone of the patent document or the patent disclosure, as it appears in Patent and Trademark Office patent file or records, but otherwise reserves all copyright rights whatsoever. See FIGS. 10A, 10B and 10C, which contain a listing of the source code for the program later specified in this description and are further illustrated by the flow charts FIGS. 9A and 9B.

Figure 2:
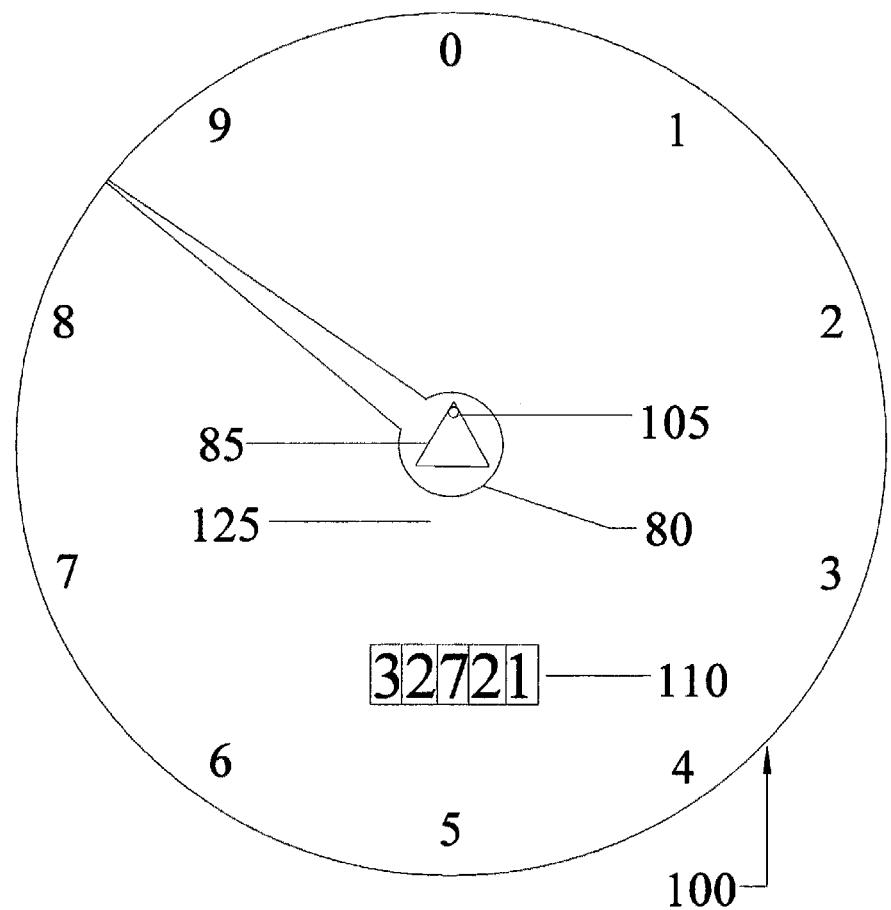
FIG. 2 is a view of the meter face showing the position of the small spot of light on the least flow indicator.

See FIG. 2. While a water meter 100 is used for purposes of disclosure, the inventive system and method may be applied to other fluids. Consequently, the invention is not limited to water meters but includes flow monitoring of any fluid. Meter 100 typically has several features visible on its face. A meter readout 110, typically consisting of a series of display wheels, provides a cumulative reading of the volume of fluid passing through the meter. Meter 100 typically includes a least flow indicator 85 that typically revolves relatively rapidly as fluid flows through the meter 100. The inventive flow monitoring system relies on monitoring the movement of the least flow indicator 85.

Figure 7:
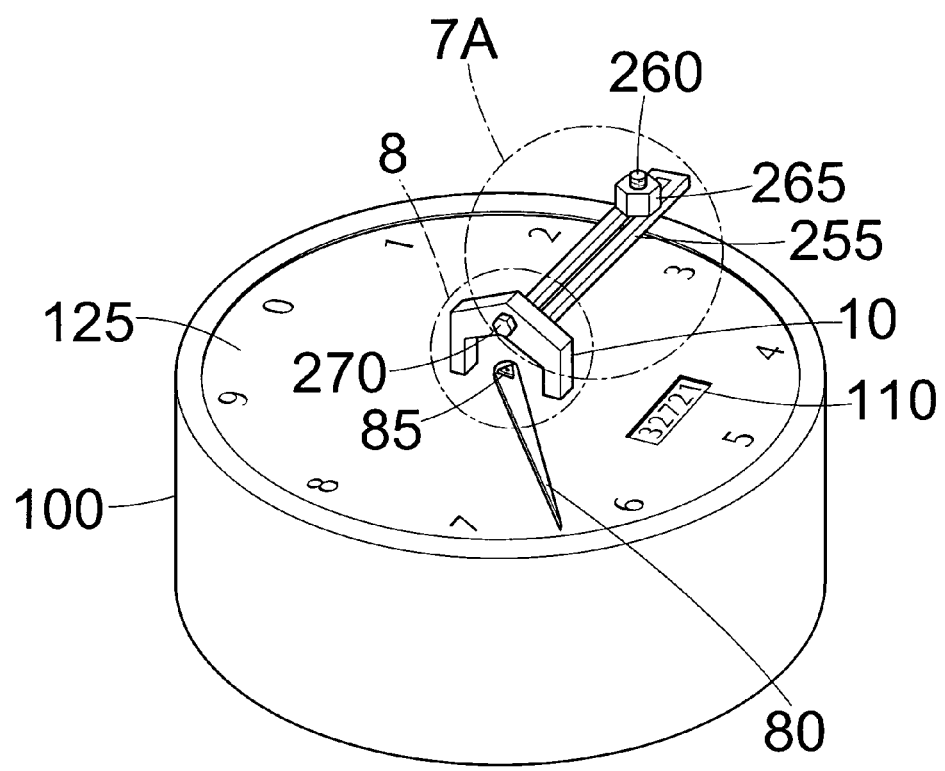
FIG. 7 is a top perspective, schematic view of a typical utility meter showing means for attaching a sensor assembly and with a sensor assembly installed in accordance with the invention.
Figure 7A:
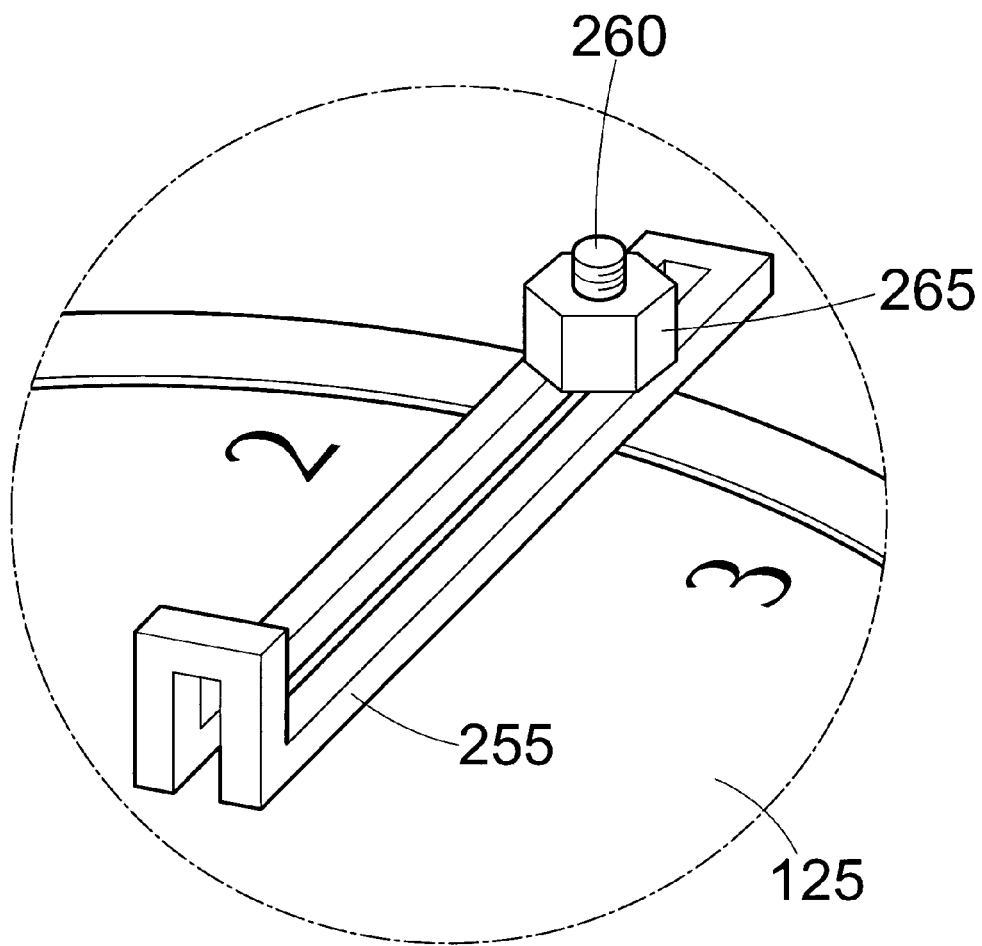
FIG. 7A is an enlarged detail of the means for attaching a sensor assembly to a meter and the slotted adjustment construction.

See FIG. 7A. A threaded welding stud 260 is affixed to the face of the meter 100, typically using an adhesive applied to the lower surface of 260. It will be recognized that any suitable method including, but not limited to, welding, gluing, fastening by a hook-and loop fastening arrangement, magnetically fastening, bolting, clamping, or otherwise attaching may be used to affix threaded stud 260 to meter 100. However, threaded stud 260 or mounting portion 255 must not obscure meter readout 110. Threaded stud 260 may be formed from a stainless steel welding stud known to those of skill in the welding art.

FIG. 1 is a drawing of the optical assembly used in the water conservation, metering, sprinkler alarm and absolute leak detection system. The body of the optical assembly 10 is made of a solid opaque, non-reflective material with stable physical and electrical properties whose size is compatible with the meter glass surface 45. The body of the optical assembly 10 is placed in proximate contact with the glass surface 45 of the meter. Item 15 is a light source utilizing a visible LED that possesses a focal point and is mounted so that the LED projects below surface 50 as shown. Item 20 is a hole in 10 to allow the light from the LED 15 to pass to the transmitting lens 25. Transmitting lens 25 is located in a counter bore on surface 55. The distance from the tip of the LED 15 to the surface of the transmitting lens 25 is the focal point of the LED 15 and also the focal point of the transmitting lens 25.

The visible light emitted from light source LED 15 is refocused by transmitting lens 25 and produces a very small visible spot of light 105 on the base of the red needle 80. The Led 15 and the transmitting lens 25 are both situated on the same optical axis 70, also known as the transmitting optical axis. Surfaces 50 and 55 are parallel to each other and both are perpendicular to the optical axis 70, insuring the proper physical and optical alignment of the LED 15 and the transmitting lens 25.

The receiving lens 30 is located counter bored on surface 60 and is focused on the least flow indicator 85. The reflected light received by lens 30 passes through hole 35 and is focused on a light sensitive device detector element 40. The detector element 40 is mounted below surface 65 as shown and is at the focal point of the receiving lens 30. Lens 30 and detector 40 are both situated on the same optical axis 75, also known as the receiving optical axis. Surfaces 60 and 65 are parallel to each other and both are perpendicular to the optical axis 75, insuring the proper physical and optical alignment of the receiving lens 30 and the detector 40.

Items 15 and 40 are mounted on a printed circuit board or flexible film. The printed circuit board or flexible film, have been omitted from FIG. 1 for the purpose of clarity. The wiring from the optical sensor 10 returning to the microprocessor board has also been omitted from FIG. 1 and all subsequent drawings again for purposes of clarity.

The angle of incidence that optical axis 70 forms with the glass surface of the meter 45 is such that the reflected light from surface 45 does not reach the receiving components lens 30 and detector 40. The reflected light from surface 45 passes out of view of receiving components lens 30 and detector 40. To further insure that the reflected light from surface 45 does not reach the receiving elements lens 30 and detector 40, optical axis 75 has been positioned at an appropriate acceptance angle so that the receiving components lens 30 and detector 40 do not see any of the reflected light from surface 45.

It would seem appropriate at this point to utilize polarized light with the required filters to reduce reflection from the glass surface 45. Filters attenuate the light, which then requires more current to produce an acceptable light output from the LED 15. Low current consumption has been a major objective of this design from the start. Unlike some laser diodes that require 30-40 milliamps to operate, the LED 15 in this design requires less than one milliamp at 5 volts to furnish the required illumination. This makes the overall efficiency of the system very high and compatible with battery operation. To simplify the LED 15 circuitry, the current through the LED 15 is constant, limited by a resistor and unmodulated. This eliminates any possible interaction with any internal circuitry of the meter itself.

It should be noted that there are many reflective optical encoders on the market made specifically to monitor a code wheel or code strip. The optics they employ allows a maximum distance of 2 mm to 3 mm between the encoder and the code wheel or code strip. In addition, the LED's employed require a recommended 20 milliamps to function and utilize an IR (non-visible) light source.

The thickness or depth of the optical assembly 10 is sufficient to accommodate the said components.

The positioning mechanism and procedure for locating the optical assembly 10 will be discussed later in this description.

Figure 3:
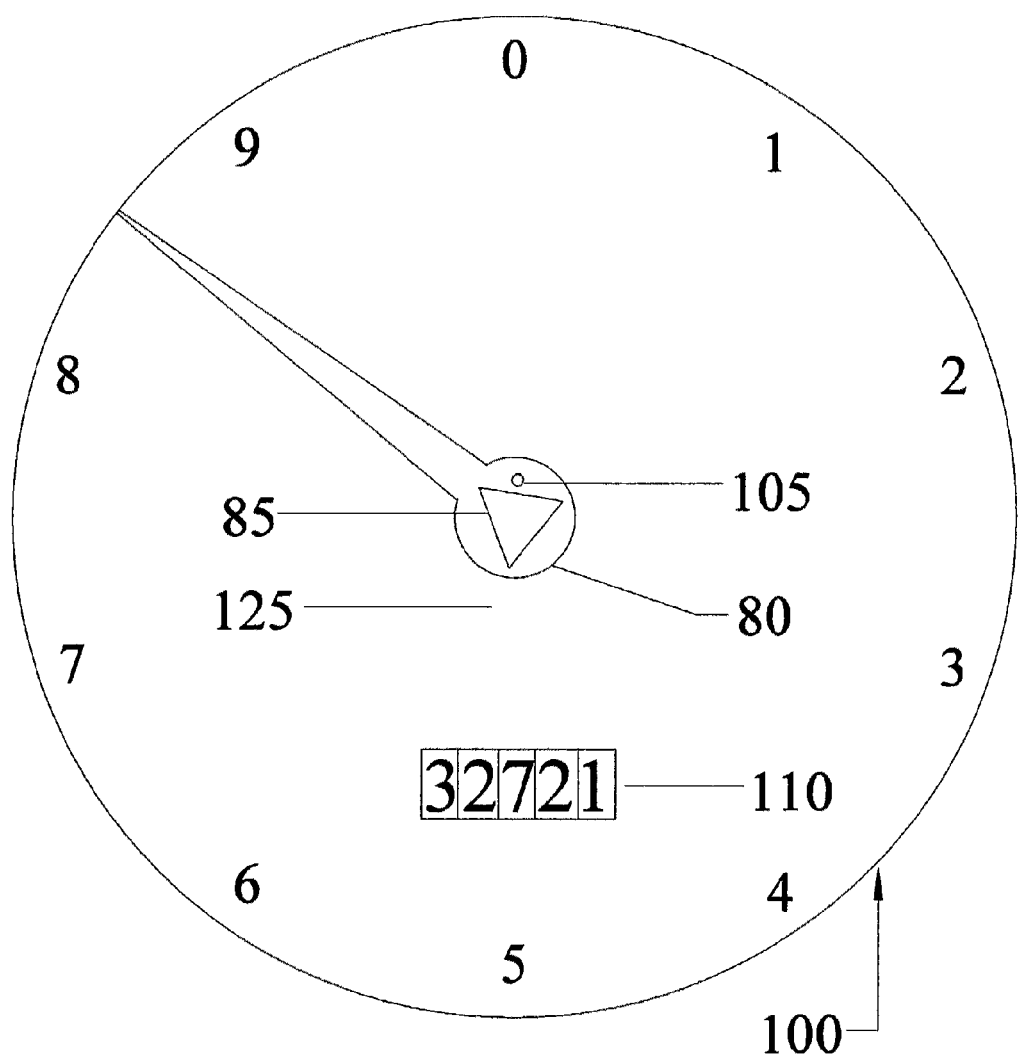
FIG. 3 is a view of the meter face showing the position of the small spot of light on the red needle after the least flow indicator has rotated out of line with the small spot of light.

FIG. 2 shows the face of a meter 100. Item 110 is a numerical display indicating the quantity of liquid that has passed through the meter. During the initial setup, the optical assembly 10 is positioned over the white least flow indicator 85 so that the visible spot of light 105 emanating from optical assembly 10 impinges upon the tip of the least flow indicator 85. This produces maximum light reflected back to the detector 40. When the least flow indicator 85 rotates out of the way as a result of fluid flow, the visible spot of light 105 now impinges on the base of needle 80, see FIG. 3. The said needle being red in color reflects very little light to detector 40. When the white least flow indicator 85 once again intercepts the light path, as a result of fluid flow, maximum light is reflected back to the detector 40 and the cycle repeats as long as the fluid flow continues.

Figure 4:
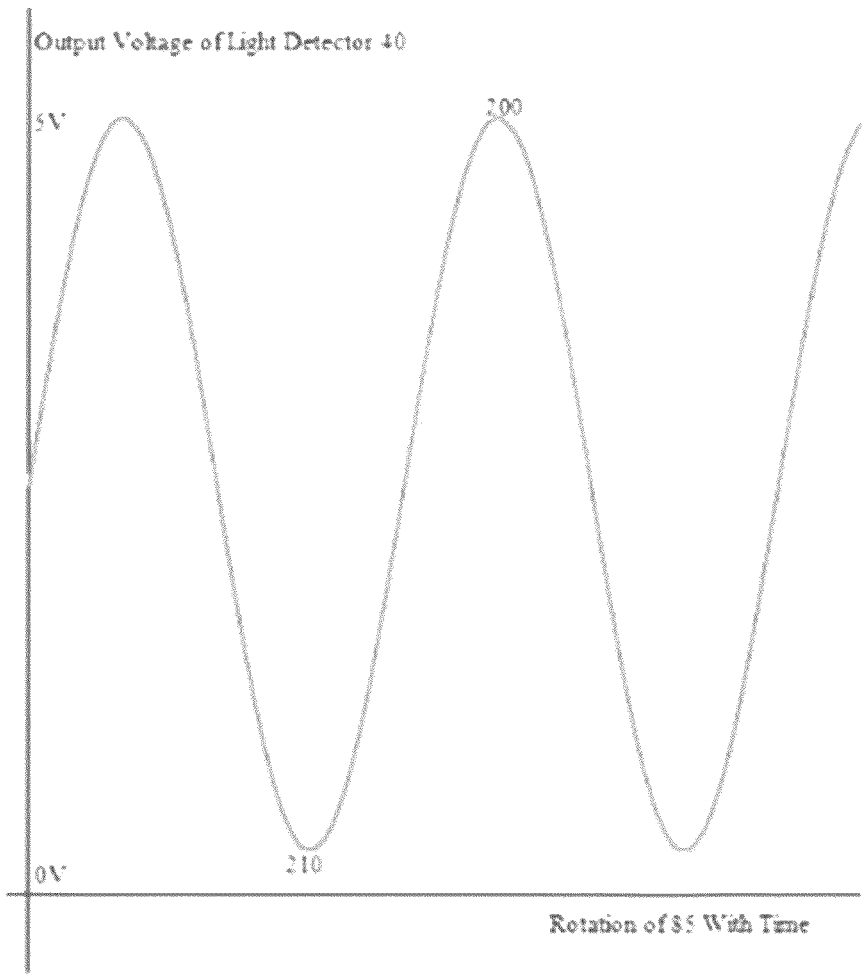
FIG. 4 is a graph of the output voltage of the light detector VS. the rotation of the least flow indicator with time.

The previously mentioned variation in light produces a voltage change in detector 40. See FIG. 4. The output voltage of the light detector 40 varies from 5 volts FIG. 4 point 200 to near 0 volts FIG. 4 point 210. This is accomplished when the least flow indicator 85 rotates from the position shown in FIG. 2 to the position shown in FIG. 3 allowing the spot of light 105 to fall on the red needle 80. If the least flow indicator 85 continues to rotate as a result of fluid flow, the cycle will repeat as long as the rotation proceeds.

The needle 80 and least flow indicator 85 are separated by a few mm but the distance is relevant. See FIG. 1. Optical assembly 10 has focused the visible spot of light 105 on needle 80 so that light spillage into area 125, a white highly reflective surface is avoided. This arrangement minimizes the reflected light going to detector 40 when the least flow indicator 85 is not intercepting the light.

A visible green (530 nm) LED 15 has been chosen for this embodiment to comply with accepted optical principals. The principals dictate that a green LED will provide the best contrast with a red target. Contrast is important since that is what determines the output voltage swing of the detector 40 FIG. 4 as the least flow indicator 85 rotates. It provides a larger working window to operate in. Contrast is also important to compensate for the misalignment of the optical assembly 10 with the least flow indicator 85. Contrast is also advantageous to compensate for the variation and ageing in said components 15, 25, 30, 40 and errors introduced in the manufacturing process.

Figure 5:
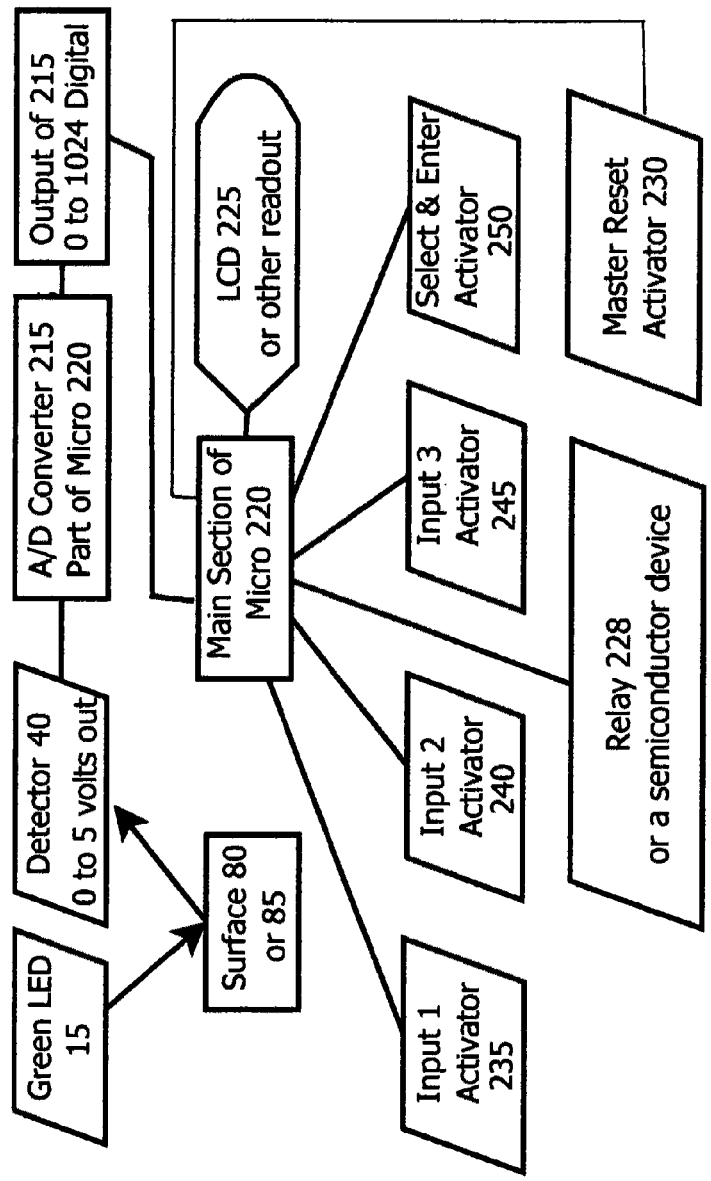
FIG. 5 is a block diagram of the major components of the system and their relationship to each other.

The detector 40 combines a photo diode and a compensated operational amplifier all in a single package. With proper illumination, the output of detector 40 will provide a rail-to-rail swing of 0 to 5 volts. This is desirable in order to fully utilize the input capabilities of the A/D converter 215 shown in FIG. 5. FIG. 5 is a block diagram of the major components of the system and their relationship to each other.

Figure 6:
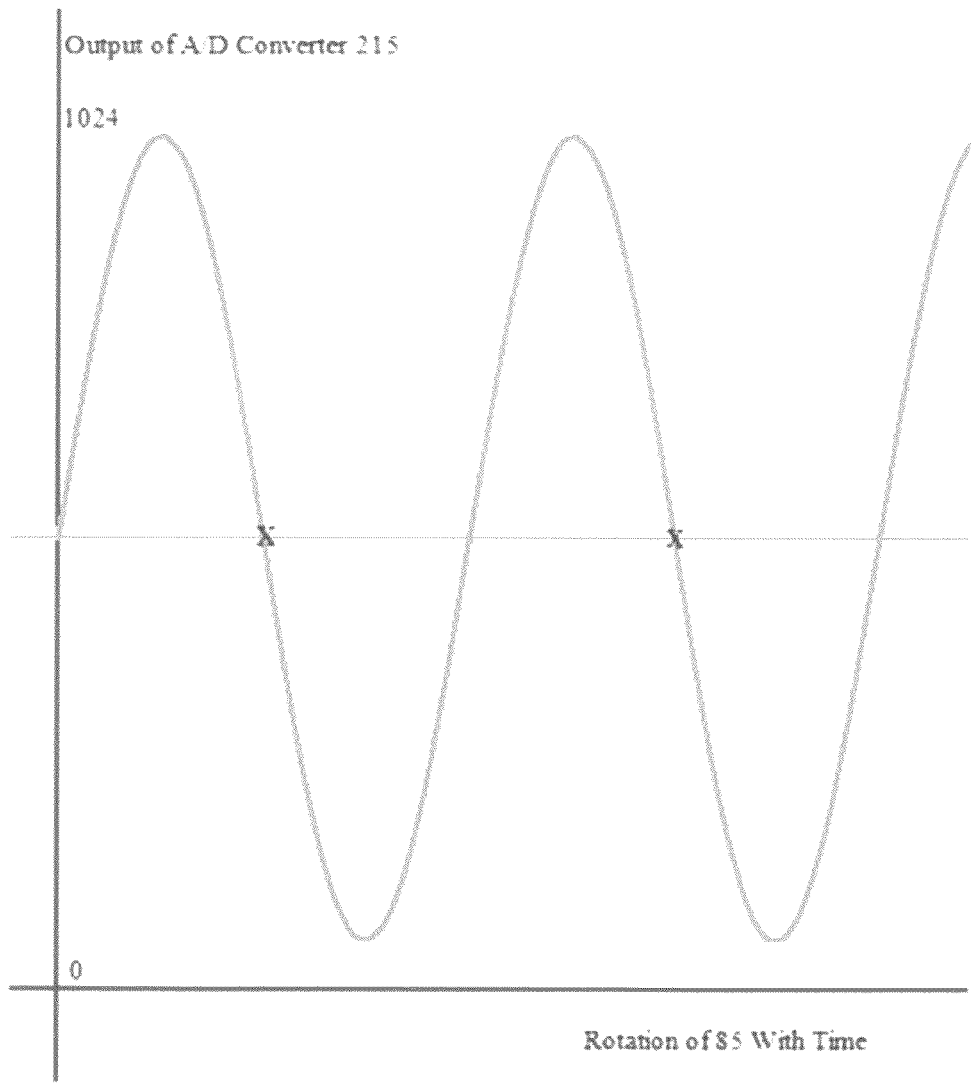
FIG. 6 is a graph of the output of the A/D converter VS. the rotation of the least flow indicator with time.

A microprocessor 220 has been programmed so that one of the inputs becomes a ten-bit A/D converter 215. With an analog input signal of 0 to 5 volts from detector 40, the A/D converter 215 will produce a digital output swing of almost 0 to 1024; this is illustrated in FIG. 6. Each digital value is equal to 0.0048 volts input due to the processing of the A/D converter. Once again, a swing of 0 to 1024 provides a large window to operate in.

FIG. 6 further illustrates a predetermined point X that indicates in this example the midpoint of the digital swing. Point X can be located anywhere on the digital swing. The microprocessor is programmed to recognize this point to initiate a count. As indicated in FIG. 6, the microprocessor is programmed to see only the downward transition through this point X to generate a count thus producing a count for each full cycle. This method is superior to using a Schmidt circuit with a variable trigger point since small variations in the digital value and the actual value of the counting point may be viewed on the LCD 225 or other readout device. In this discussion, "Or Other Readout Device" may be substituted for the LCD 225.

Figure 9A:
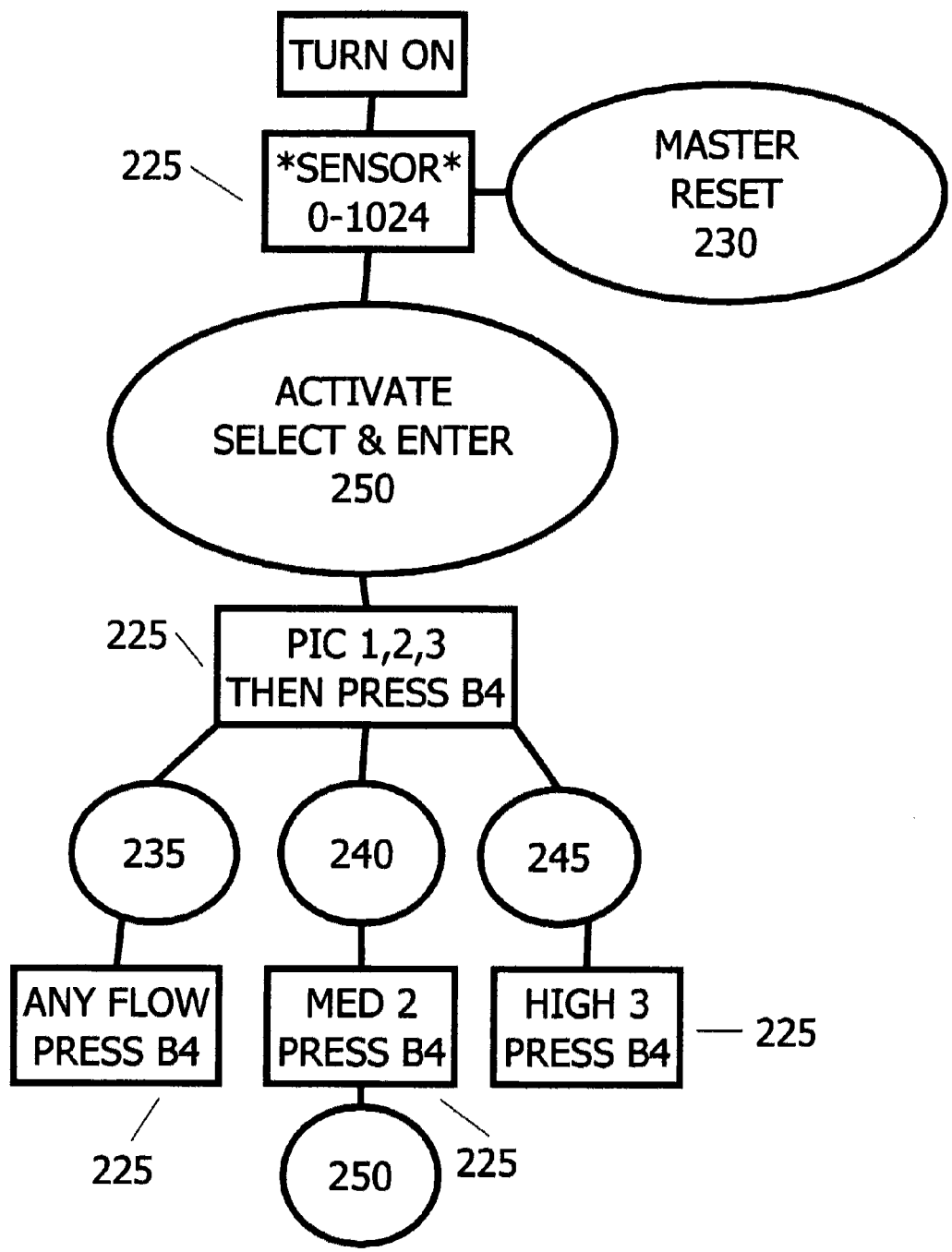
FIGS. 9A and 9B are the flow diagrams of the microprocessor program.

See FIG. 9A. When power is first applied, the LCD 225 will display "SENSOR" and below it, the numerical reading of the detector 40 after it has been converted to digital form. It is this reading that will be used to optimally position the optical assembly 10 over the red needle 80 and the least flow indicator 85. By operating activator 230 "Master Reset" at anytime, the screen will return to the "Sensor" display.

FIG. 7 shows the mechanical positioning components. A threaded welding stud 260 is attached to the body of the meter 100. A slotted adjustment arm 255 is attached to the optical assembly 10 to facilitate positioning in the X, Y, and Z plane. The slotted section extends upward to provide a mounting surface for the optical assembly 10. See FIG. 7A. The X, Y plane is the meter surface 45. A retaining nut 265 is used to lock the slotted adjustment arm 255 in place after the optimum position is obtained. See FIG. 8. Screw 270 is used to adjust and lock the optical assembly 10 in the Z plane.

Figure 8:
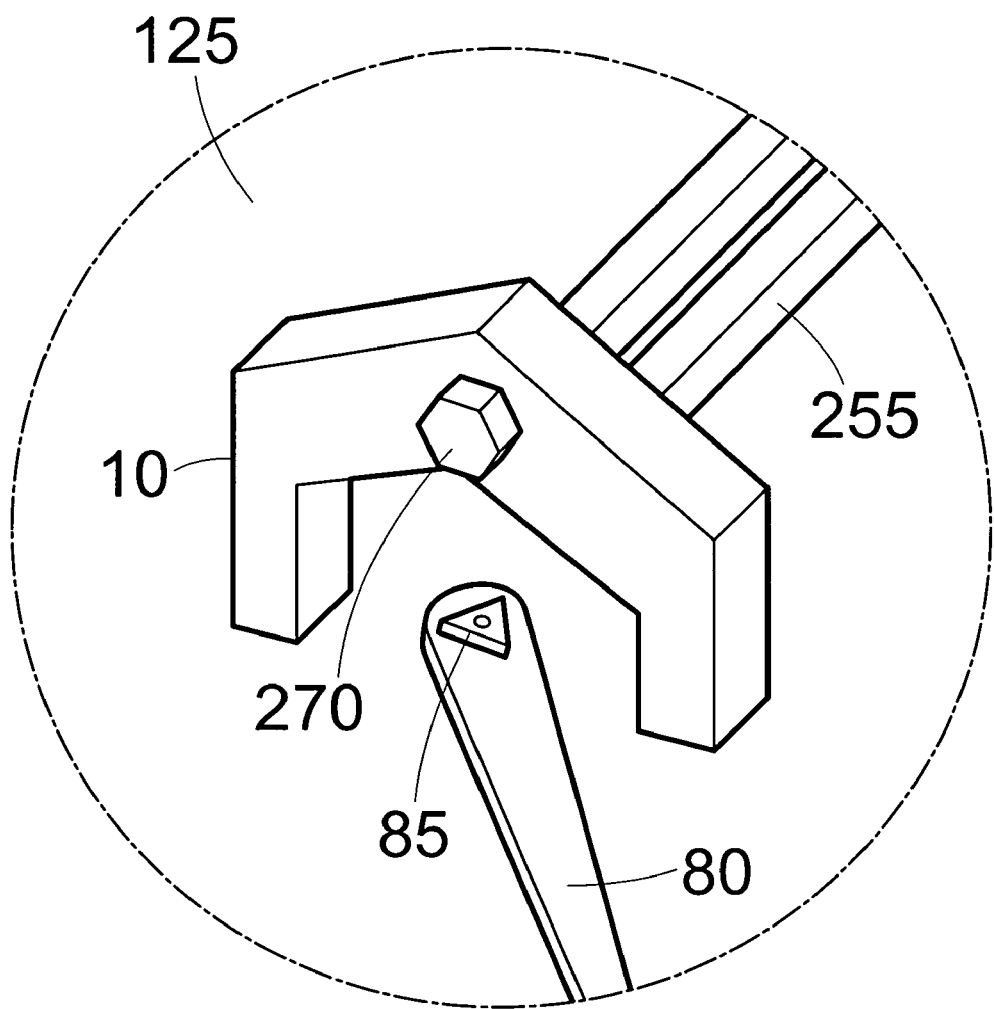
FIG. 8 is an enlarged detail of the sensor assembly placement over the least flow indicator of the meter.

FIG. 8 is an enlarged view of FIG. 7. The height of 10 has been exaggerated to clearly show items 80 and 85. It shows the optical assembly 10, the red needle 80, the least flow indicator 85, the white meter surface 125, the slotted arm 255 and the adjustment screw 270. The optical assembly 10 has been constructed so that the user is able to see the location of the spot of light.

The optimal positioning of the optical assembly 10 over the least flow indicator after energizing system is as follows:
1. Place 10 against the surface of meter glass 45.
2. Position light spot 105 on the tip of least flow indicator 85 as shown in FIG. 2 and gently tighten retaining nut 265 and 270.
3. Cause a small amount of fluid to flow so that the least flow indicator 85 reaches the position shown in FIG. 3.
4. Make sure the light spot 105 is positioned on the red needle 80.
5. Securely tighten retaining nut 265 and 270.
6. If the ambient light level is high, cover the meter assembly with a black hood.
7. Once again, cause a small amount of fluid to flow and observe the digital reading on the LCD 225 screen. Ideally, the reading will vary between 0 and 1024. This swing will not be achieved in most cases. A swing of 100 to 900 would be considered good. If necessary, loosen 265 and reposition the light spot 105 to maximize the swing with a small amount of fluid flowing. The objective is to get a good high reading when the least flow indicator 85 is in position to reflect the light spot 105 and a good low reading when the red needle 80 is reflecting light spot 105.

It should be noted that as fluid flows through meter 100 the red needle 80 would also rotate. If the light spot 105 has been properly positioned this rotation will have no affect on the overall operation.

Through suitable software, the count generated by the rotation of the least flow indicator (target) yields a number that is representative of the amount of fluid that flows through the meter. This number is then converted into a flow rate; gallons/min, cubic feet/min etc. and would be displayed on the LCD 225 screen. One rotation of the least flow indicator 85 is equal to n times one rotation of the red needle 80. This relationship is fixed by the gear ratios internal to the meter. In this embodiment, the least flow indicator 85 is a triangle therefore; three counts will be produced for each rotation of the least flow indicator 85. To those skilled in the art of programming, these counts are easily converted into flow rates. A graphic display utilizing bar graphs, pie charts, etc. could also be used in place of or addition to a numerical display.

See FIG. 9A. As mentioned earlier, when the system is first turned on, the LCD 225 will display the digital reading from the A/D converter 215 and the word "SENSOR". After the optical assembly 10 is properly positioned over the least flow indicator 85, at this point, by visually observing the LCD, any change, either an increase or decrease in the numeric reading no matter how small would be indicative of fluid flowing through the meter. Whether the reading was increasing or decreasing would depend upon the relationship between the least flow indicator 85 and the light source 105, see FIGS. 2, 3, and 6. As an example, if the visual observation started with the relationship shown in FIG. 2, a very small rotation of 85 would indicate a decrease in the reading. If the visual observation started with the relationship shown in FIG. 3, a very small rotation of 85 would indicate an increase in the reading. Please note that the actual starting point is not important, the reading produced by the rotation of 85 will be somewhere on FIG. 6 either increasing or decreasing from the first observed starting value. While in the "SENSOR" mode, observing the said reading on the LCD 225 will provide a faster indication of a leak than the programmed "Any Flow" that follows.

In one embodiment, see FIG. 5, activators 235(input 1), 240(input 2), 245(input 3) and 250 are assigned values of: "Any Flow", "Medium", "High" and "Select and Enter" respectively. The actual flow values of "Medium" and "High" are predetermined by variables in the software.

To further clarify,
Activator 230="Master Reset."
1=input 1=activator 235="Any Flow."
2=input 2=activator 240="Medium."
3=input 3=activator 245="High."
B4=activator 250="Select & Enter."

Figure 9B:
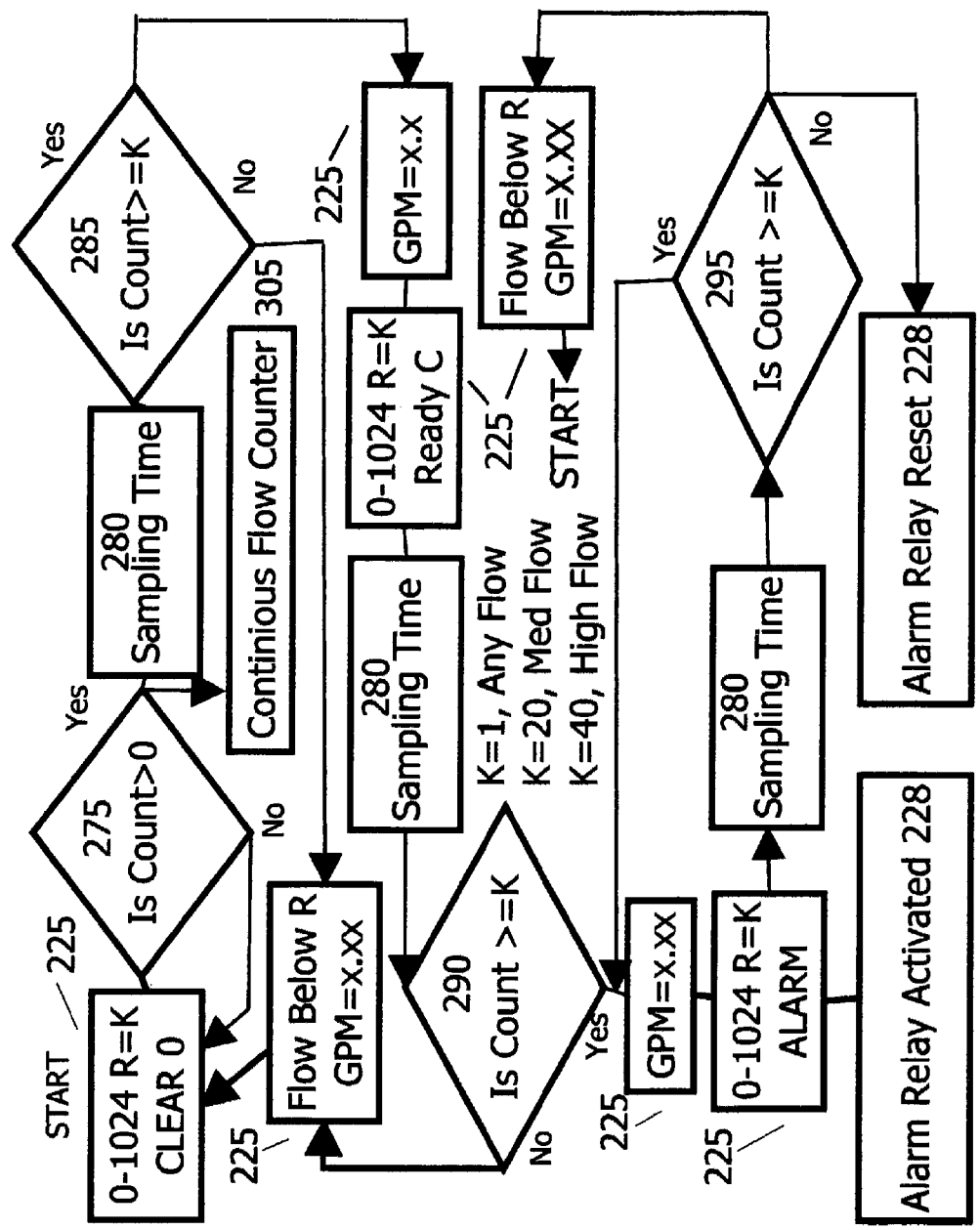

To reiterate, FIGS. 9A and 9B will take us through the complete operation of the program and what is displayed on the LCD 225.

When power is first applied "TURN ON," the LCD 225 will display [SENSOR, 0-1024]. All bracketed terms indicate what the LCD 225 will display. The 0-1024 is the numerical reading from the A/D converter. It should be noted that the "Master Reset" 230 may be activated at any time to reset back to "SENSOR." The next step is to activate "SELECT & ENTER" 250. The LCD 225 will then display [PIC 1, 2, 3 THEN PRESS B4]. If activator 235 is chosen, the LCD 225 will display [ANY FLOW, PRESS B4]. If activator 240 is chosen, the LCD 225 will display [MED 2 PRESS B4]. If activator 245 is chosen, the LCD 225 will display [HIGH 3, PRESS B4]. After a selection is made and B4 (250) is activated, the following screen will appear, see FIG. 9B.

At the "START" the LCD 225 will display [0-1024 R=K, CLEAR 0]. The 0-1024 is the reading from the A/D converter 215. R=K indicates the range chosen, where K=1 indicates any flow, K=20 indicates medium flow and K=40 high flow. CLEAR indicates that the alarm relay 228 or a semiconductor device is in the CLEAR state. In the following discussion, "A Semiconductor Device" can be substituted for the alarm relay 228. The space next to CLEAR is occupied by a number, which represents the count produced by the said software. At the very start of the monitoring procedure, this number will be 0. Taking a step to the right to decision 275, the program asks if the count is greater than zero. If NO, the program returns to START. If YES, the program starts a sampling timer 280 whose time is dependent upon the range chosen. When K=1 any flow, the sampling time is long in order to detect any motion of the least flow indicator 85. For K=20 and K=40 a relatively short sampling time is required. If YES, the program also starts a "Continuous Flow Counter," 305. The function of this counter will be explained later in this write-up. At the end of the sample time 280, we reach decision 285 that asks the question, is the count>=K. during the sample time, the number next to CLEAR on the LCD 225 will display the actual count. If NO, the LCD 225 will momentarily display [Flow Below R, GPM=X.XX] and then return to START. The GPM is the actual calculated gallons per minute that is flowing through the meter. If YES, the LCD 225 will momentarily display [GPM=X.XX] and then [0-1024 R=K, READY C]. A YES output from decision 285 will be defined as an event. The term READY indicates that the count has been > or = to K for one sampling time and C is the number of counts received. The program progresses through another sampling time and continues to decision 290 and asks is the count>=K. If NO, the LCD 225 will momentarily display [Flow Below R, GPM=X.XX] and then return to START. If YES, the LCD 225 will momentarily display [GPM=X.XX] then [0-1024 R=K, ALARM]. A YES output from decision 290 will also be defined as an event. At this point alarm relay 228 is activated. The program progresses through another sampling time to decision 295 and asks is the count>=K. If NO, the program takes us to the LCD 225 display [Flow Below R, GPM=X.XX] and then return to START. The alarm relay 228 will be reset at this point. If YES, the LCD 225 will momentarily display [GPM=X.XX] then [0-1024 R=K, ALARM]. In other words, at this point, if the count is > or = to K, the system will remain in the ALARM condition with the alarm relay 228 activated. The purpose of the ALARM is to notify the homeowner, central station or other concerned parties that an abnormal condition exists.

In order to avoid false alarms, the program has been designed to require that the count must be >=K for two successive sampling times in order to generate an alarm. This means that two events were generated. This sampling time X2 is long enough to compensate for the refilling of an automatic icemaker, toilet refilling due to evaporation and replenishment of water in a heating system etc. This function has been clearly demonstrated in FIG. 9B.

If there is a continuous flow that exists within the defined ranges that extends beyond a reasonable time, the Continuous Flow Counter will detect this and generate an alarm condition. The LCD 225 will display [0-1024 R=K, ALARM] and the alarm relay 228 will be activated. As an example, with R=20 or R=40, without the Continuous Flow Counter, if the flow remained within the range specified, the flow could continue forever without any indication of abnormality.

In the present embodiment, a flow of about one drop per second will be detected. Utilizing a longer sample time, a flow of one drop per minute would be detected. Just to review, a pulse or count will occur when the least flow indicator 85 (target) moves enough to cause a downward transition through point X on FIG. 6. Since no coupling capacitors are used, the pulse or count is not dependant on the rate of change but on the absolute movement of the least flow indicator 85.

In one embodiment a time keeping device would be incorporated, that would display the time, day of the week, month and year. Activators would be used to set the said parameters.

In one embodiment, the sensor assembly is molded into a snap-on disc that positions itself on the face of the meter: this will automatically position the sensor over the least flow indicator.

In one embodiment, the microprocessor will learn the normal flow pattern and indicate an alarm when an abnormal condition exists. When set in the learn mode, appropriate software algorithms will be employed to accomplish this task. An appropriate number of days will be used in the learn mode to obtain reliable results. The said algorithms are well known to those skilled in the art of programming.

In one embodiment, a simplified version could be employed to furnish a sprinkler alarm. The sensor, microprocessor with an A/D converter would still be required but the software would be less complicated. This embodiment would monitor the flow rate for a given time with appropriate delays included. In a wet system, this configuration would detect any leaks.

In one embodiment, a RF link is provided between the sensor assembly and the main control panel to eliminate the need for wiring between the two. This would require a RF transmitter at the sensor assembly and a RF receiver at the main control panel. Present state of the art transmitters require very little current consumption and since the LED in the sensor assembly consumes less than one MA, this arrangement is feasible.

In one embodiment, an output of the microprocessor would be connected to a commercially available, electrically operated solenoid or diaphragm valve in order to cut off the flow of water when the limits are violated. Software would be provided to latch the valve in the required state; resetting would be accomplished through the use of one of the actuators.

In one embodiment, a speaker is provided with the necessary circuitry, so that when there is water flow, a chirping or other non-obnoxious sound like the sound of water flowing would be heard. A volume control would be provided to control the amplitude.

It can be seen that with a reliable electrical signal emanating from the optical sensor and the conversion of that signal to digital form, many variations are possible using appropriate software.

The present invention may, of course, be carried out in other specific ways then those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A system for non-intrusively monitoring flow in a fluid distribution system having a fluid flow meter associated therewith, comprising: a) a sensor assembly adapted for adjustable placement proximate a meter in a fluid distribution system, said sensor assembly adapted to generate an electrical signal representative of a flow of fluid through said meter; and b) a programmable microprocessor operably attached to said sensor assembly for receiving said electrical signal, comprising: I) A/D converter; ii) means for measuring time; iii) means for indicating a magnitude of said electrical signal; IV) means to measure the amount of fluid flowing; and V) means for generating an alarm signal based on a predetermined relationship of flow and time;
    wherein said sensor assembly comprises a light-emitting element, a transmitting lens, a photosensitive element, a receiving lens and a plurality of lenses;
    wherein a mechanical package is constructed so that the surfaces holding the LED and the transmitting lens are parallel to each other and perpendicular to the transmitting optical axis and the surfaces holding the photosensitive element and the receiving lens are parallel to each other and perpendicular to the receiving optical axis.

2. The system for non-intrusively monitoring flow in a fluid distribution system as recited in claim 1; wherein said sensor assembly comprises an optical sensor assembly.

3. The system for non-intrusively monitoring flow in a fluid distribution system as recited in claim 2; wherein said sensor assembly is removeably, adjustably attached to said meter.

4. The system for non-intrusively monitoring flow in a fluid distribution system as recited in claim 3; wherein said meter comprises a least flow indicator and said sensor assembly is adjusted to monitor primarily the movement of said least flow indicator.

5. The system for non-intrusively monitoring flow in a fluid distribution system as recited in claim 1; wherein said light-emitting element comprises a visible LED and said photosensitive element comprises a photodiode and an amplifier.

6. The system for non-intrusively monitoring flow in a fluid distribution system as recited in claim 1; wherein said mechanical package comprises, the light-emitting element, the transmitting lens, the photosensitive element and the receiving lens.

7. The system for non-intrusively monitoring flow in a fluid distribution System as recited in claim 6; wherein a means is provided so that the said light-emitting element, transmitting lens combination is mounted on a transmitting optical axis forming an angle of incidence with the meter glass surface so that the reflective light from the said surface will pass out of view of the said photosensitive element, receiving lens combination.

8. The system for non-intrusively monitoring flow in a fluid distribution system as recited in claim 6; wherein a means is provided so that the receiving lens, photosensitive element combination is mounted on a receiving optical axis forming an angle with the meter glass surface so that the reflected light from the said surface is not detected but the reflected light from the least flow indicator is detected.

9. The system for non-intrusively monitoring flow in a fluid distribution system as recited in claim 1; wherein the microprocessor A/D converter is configured as a ten bit converter.

10. The system for non-intrusively monitoring flow in a fluid distribution system as recited in claim 1; wherein the said microprocessor comprises a programmable device wherein a time associated therewith may be externally preset.

11. The system for non-intrusively monitoring flow in a fluid distribution system as recited in claim 10; wherein said programmable device may be externally preset using a plurality of activators.

12. The system for non-intrusively monitoring flow in a fluid distribution system as recited in claim 11; wherein said activator comprises at least one selected from the group: a push button switch, a position on a touch screen LCD programmed as an activator.

13. The system for non-intrusively monitoring flow in a fluid distribution system as recited in claim 1; wherein said means for indicating a magnitude of said electrical signal comprises at least one selected from the group: a LCD, or other readout device.

14. The system for non-intrusively monitoring flow in a fluid distribution system as recited in claim 1; wherein said means to indicate the amount of fluid flowing comprises at least one selected from the group: a LCD, or other readout device.

15. The system for non-intrusively monitoring flow in a fluid distribution system as recited in claim 1; wherein said microprocessor will provide means to calculate and indicate the amount of fluid flowing in units comprising at least one selected from the group: gallons, cubic feet, liters, cubic liters and cubic meters.

16. The system for non-intrusively monitoring flow in a fluid distribution system as recited in claim 1; wherein said means for generating an alarm signal comprises at least one selected from the group: a relay, a semiconductor device.

17. The system for non-intrusively monitoring flow in a fluid distribution system as recited in claim 16; wherein a means is provided so that a plurality of successive events are required in the software to cause said alarm.

18. The system for non-intrusively monitoring flow in a fluid distribution system as recited in claim 1; wherein the means to improve the focus and reduce spherical aberration said lenses are aspherical.

\* \* \* \* \*